United States Patent
Hoffmann et al.

[15] 3,660,194
[45] May 2, 1972

[54] METHOD OF FABRICATING FLUID-TIGHT CONTAINERS

[72] Inventors: Arthur W. Hoffmann, Hunibach; Pierre Locuty; Walter Buhlmann, both of Thun, all of Switzerland

[73] Assignee: Gebr. Hoffman AG, Thun, Switzerland

[22] Filed: Dec. 21, 1970

[21] Appl. No.: 100,196

Related U.S. Application Data

[63] Continuation-in-part of Ser. No. 708,070, Feb. 26, 1968, abandoned.

[30] Foreign Application Priority Data

Feb. 24, 1967   Sweden.................................2784/67

[52] U.S. Cl................................156/191, 156/195, 156/218, 156/244
[51] Int. Cl............................................................B65h 81/00
[58] Field of Search.................156/190, 191, 192, 195, 218, 156/202, 203, 244

[56] References Cited

UNITED STATES PATENTS

| | | | |
|---|---|---|---|
| 2,623,444 | 12/1952 | Maier et al.............................. | 156/202 |
| 3,140,196 | 7/1964 | Lacy et al. .......................... | 156/244 X |
| 3,312,250 | 4/1967 | Sirignano et al........................ | 156/195 |
| 3,332,387 | 7/1967 | Garner.................................... | 156/203 |
| 2,539,450 | 1/1951 | Magill................................ | 156/195 X |
| 3,038,832 | 6/1962 | Carlson et al....................... | 156/195 X |
| 3,247,869 | 4/1966 | Boegershausen et al........... | 156/195 X |
| 3,385,179 | 5/1968 | Roe ............................................ | 93/94 |
| 3,494,812 | 2/1970 | Cvacho............................... | 156/244 X |
| 3,563,826 | 2/1971 | O'Neal.................................. | 156/190 |

Primary Examiner—Carl D. Quarforth
Assistant Examiner—Gary G. Solyst
Attorney—Jennings Bailey, Jr.

[57] ABSTRACT

There is disclosed a method of producing gas-tight and liquid-tight containers, especially collapsible tubes wherein a strip of plastic coated carrier foil is bent or wound into the shape of a substantially cylindrical tube, the longitudinal edges of the strip being arranged in overlapping relationship. These longitudinal edges are then heat-sealed and the tube is coated with a sheath of plastic for covering the overlapping seams and providing a smooth continuous outer surface capable of receiving an imprint. Further, according to the invention the amount of plastic material and application thereof to the surface of the tube is controlled such that the outside surface of such tube when covered with the plastic sheathing possesses a shape and dimension substantially corresponding to the internal receiving wall of a mold cavity for heading the tube. The tube, typically after having been cut into finite tube sections, is then inserted at one end into a mold cavity, the outside surface of such tube section snugly fitting in good sealing relationship against the internal receiving wall of the mold cavity. The inner wall of the tube section, at least at the end region thereof received in the mold cavity is freely exposed, so that when moldable material is introduced into the mold cavity it contacts such exposed inner wall, thereby producing a substantially radially directed force applied outwardly against the inner exposed wall of the tube, urging the outer wall thereof into extreme sealing contact with the internal receiving wall of the mold cavity so that an extremely effective seal appears at the location where the tube section has been inserted into the molding cavity.

14 Claims, 4 Drawing Figures

PATENTED MAY 2 1972　　　　3,660,194
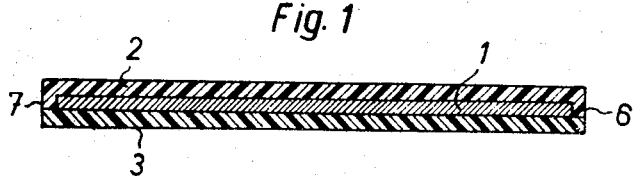
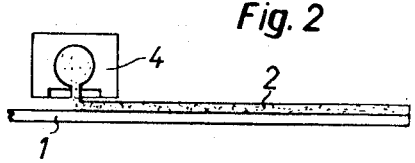
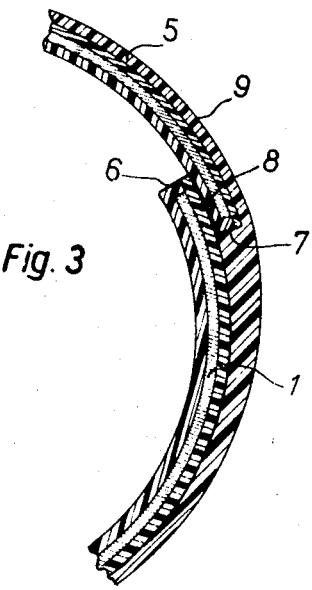
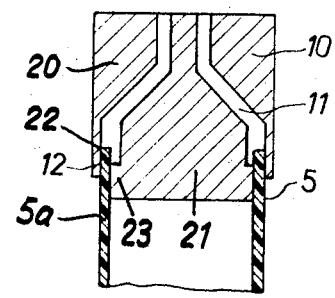
INVENTORS
ARTHUR W. HOFFMANN
PIERRE LOCOTY
WALTER BÜHLMANN
BY

METHOD OF FABRICATING FLUID-TIGHT CONTAINERS

CROSS-REFERENCE TO RELATED APPLICATION

The present application is a continuation-in-part application of our commonly assigned, co-pending United States application, Ser. No. 708,070, filed Feb. 26, 1968, now abandoned and entitled "METHOD OF PRODUCING FLUID-TIGHT CONTAINERS."

BACKGROUND OF THE INVENTION

The present invention relates to a new and improved method for the production of gas-tight and liquid-tight containers, particularly collapsible tubes.

Flexible containers consisting of plastic, particularly collapsible tubes for substances such as pastes, jellies, emulsions, liquids, foams, powders, etc., have been heretofore produced by injection molding, extrusion or blowing of plastic to the desired shape. Such techniques, however, have the disadvantage that when using materials best suited for injection molding and which are flexible in polymerized condition, such as for example polyethylene, PVC, PVDC, there are obtained porous container walls which are permeable to gas. Consequently, the substances filled into the thus produced containers tend to alter after prolonged storage (oxidation, loss of water, loss of flavor, etc.), and thus, will become useless. This is particularly the case when the filling substance or container contents contains a solvent or additions having a low boiling point. A further disadvantage consists in that a plastic suitable for injection molding is not compatible with all desired filling substances. The filled-in substance, due to its contact with the container wall, is subject to chemical reactions or change, or to alterations in taste or smell, or to changes of consistency, which alternations or changes prevent its intended use.

Another significant drawback of the heretofore existing manufacturing techniques for collapsible tubes resides in the actual heading of the tube, that is, the provision of the tube with a closure portion or end. This is so because the tube body generally is not sufficiently formed as to shape and dimension that it can be readily introduced, as such, into a mold cavity for applying the tube cap or head. Consequently, the prior art techniques have needed to resort to specially designed molds, particularly equipped with specially constructed seals or sealing arrangements for receiving the tube body and preventing outflow of plastic material used for forming the cap during the heading operation.

SUMMARY OF THE INVENTION

Accordingly, a real need still exists in the plastic tube manufacturing art for an improved tube manufacturing technique which is not associated with the aforementioned drawbacks prevailing in the state-of-the-art techniques. Therefore, a primary object of the present invention is directed towards the provision of an improved fabricating technique for fluid-tight containers or tubes which is not associated with the aforementioned drawbacks of the prior art and which effectively, reliably and economically fulfills the existing need.

Still another important and more specific objective of this invention concerns an improved manufacturing technique for the production of fluid-tight containers or tubes providing for a tube construction which is not only impervious to liquids and gases, to protect the container contents, but additionally, ensures that the container or tube body, during its manufacture, is fabricated in such a way, and specifically to possess a shape and dimension such that it can be readily received in sealing fashion within a mold cavity for applying the cap or head to the tube, thereby eliminating the need for complicated mold structures and sealing arrangements.

Yet a further significant object of the present invention relates to the fabrication of tube or container bodies possessing a shape and dimension satisfactory for application of the heading to the tube in a facile, economical and highly productive manner with a minimum of complication.

Now, in order to implement these and still further objects of the invention, which will become more readily apparent as the description proceeds, the invention contemplates a novel method for the fabrication of fluid-tight collapsible tubes, which comprises the steps of coating an impervious, substantially strip-shaped carrier foil on at least one side with a heat-sealable plastic. The coated carrier foil is then formed into the shape of the container body and adjacent overlapping edges of the coated carrier foil forming such container body are heat-sealed at such location. A plastic sheath is then applied in a controlled fashion over the heat-sealed container body, to cover the outside of the body and to provide a smooth outer surface readily capable of receiving an imprint. According to a significant aspect of this invention, the amount of plastic sheathing material applied to the container body and the ultimate shape of such container body is controlled so that the outside surface possesses a dimension and configuration substantially corresponding to the inner wall of a mold cavity of a mold serving to head the tube. Prior to the actual tube heading operation, the thus-produced container body is preferably cut into finite tube lengths, each of which possesses an outside surface, at least at the end region thereof destined to be inserted into the mold cavity, whose configuration and dimension substantially corresponds to the internal receiving wall of the molding cavity. Thereafter, the tube section is inserted at one end into the mold cavity, bearing snugly by means of its outside surface against the inner wall of the molding cavity while the actual inside wall of the end portion of the thus-inserted tube section is exposed. Thereafter, plastic material for heading the tube section is introduced into the mold, flowing through the mold cavity into the region of the exposed inner wall of the tube section. This plastic material, which is under pressure, acts against the inner wall of the tube section to exert a radially directed force which further seats the outside surface of the tube section received within the mold cavity against the internal or inner receiving wall of the mold cavity itself, to thus provide an effective seal preventing the penetration of moldable plastic material externally of the mold itself. Due to the controlled shaping of the tube section, prior to the time that it is capped or headed, and specifically wherein the external diameter of such tube section is only slightly less than the internal receiving cavity of the mold itself, it is possible to apply the heading to the tube section without resorting to complicated sealing arrangements or mold structures inasmuch as the tube section itself in cooperation with the inner receiving wall of the mold provides the seal.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is a schematic transverse sectional view through a plastic coated carrier foil, wherein the dimensions of the thickness of the carrier foil itself and the coatings applied thereto have been shown on an exaggerated or enlarged scale for the purposes of clarity in illustration and explanation of the inventive concepts;

FIG. 2 is a schematic illustration of the coating step for the carrier foil, in this case by means of a slotted die arrangement;

FIG. 3 is an enlarged fragmentary sectional view of the container or tube body prior to the heading thereof, and again wherein the thickness of the various layers of the tube have been exaggerated appreciably for the purpose of clarity and simplification in explanation of the invention; and FIG. 4 is a diagrammatic view showing the step of heading the tube body of FIG. 3, in other words, molding of a tube head or cap to the end of a length of tubing during the production of collapsible tubes pursuant to the present invention.

DETAILED DESCRIPTION OF THE PREFERRED EMBODIMENTS

Turning now to the drawings, and referring specifically initially to FIG. 1, there will be seen a thin metal foil 1, used as the carrier foil, and coated on at least one side, but preferably both sides with a plastic material 2 and 3. The metal foil 1, for instance constituted by an aluminum foil, or a foil of another metal or metal alloy, is completely gas-tight and liquid-tight. This thin metal foil 1 furthermore is also flexible so that it can be advantageously used for the production of containers, such as collapsible tubes, which during use, undergo a change in shape when the contents are dispensed.

Additionally, the carrier foil 1 can also be formed from one or two layers of non-metallic material, such as layers of fiber material, paper for instance. This non-metallic material itself can be gas-tight or can be treated previously according to any appropriate technique suitable for such purpose to render same gas-tight. Moreover, carrier foil 1 can also be composed of several different materials and can consist of, for example, a paper sheet laminated with a metal, such as aluminum.

By appropriately selecting the nature of the carrier foil material, it is possible to obtain additional properties for the container wall apart from the gas-tightness and flexibility discussed above, such as for instance protection of the filled container contents against radioactive radiation. To this end, a lead foil or a foil containing lead can be used as the carrier foil 1. Owing to the coating of the carrier foil with a plastic layer or layers 2,3 the carrier foil itself does not contact the contents of the container, so that the properties of the foil which themselves might be or are detrimental to the filled container contents, such as the toxic effect of a lead-containing foil on an edible substance filled into the container, or a filling substance coming into contact with the human body, need not be particularly considered. Owing to this measure, there is complete isolation of the material of the foil from the container contents.

Considering now more fully the actual method aspects of the present invention, it will be understood that according to a first procedural step the impervious strip-shaped carrier foil 1, while in flat condition, is preferably coated on both sides with a thin layer of heat-sealable plastic material 2 and 3. The coating operation can be performed, for instance, through the use of a suitable standard slotted die 4 by means of which the plastic is applied to the foil 1 which may be in the form of a continuous web. Of course, other types of coating hardware suitable for application of a plastic film to a foil are capable of being used in the practice of the instant invention. Embedding of the foil 1 in the plastic layers 2 and 3 ensures that the foil itself no longer makes direct contact with the filling substance i.e., the substance filled into the container, conveniently termed the container or tube contents. The composition of the plastic material applied to the foil 1 can be chosen such that it is compatible with the container contents without requiring that consideration be given to the fact whether the plastic material itself, which is suitable for contact with the container contents, is also gas-tight, has sufficient strength to form the container wall, or presents other properties required for its use as a container structure. Since coating of the carrier foil 1 is carried out such that there is only provided a slight coating thickness, the mechanical properties of the carrier foil, such as its flexibility, are totally preserved, and yet its strength is correspondingly increased.

Advantageously, embedding of the impervious foil 1 is undertaken such that the plastic used for coating that side or face of the foil 1 which later on is to constitute the inner wall or inside of the container or tube, engages about the lateral edges of the foil 1, as best shown by referring to FIG. 1, and further, at the lateral edges will be seen to be substantially flush with the other coated side of the foil which is to constitute the outside surface of the container or tube.

It may be especially desirable or advantageous to coat the two sides of the carrier foil 1 with different materials. Hence, the plastic material used to coat the side of the foil which later on during fabrication will constitute the inside of the container or tube, conveniently indicated by the plastic layer 2, can be chosen according to the requirements imposed upon contact of this plastic layer 2 with the filled substance of the container. On the other hand, the other plastic material for forming the coating or layer 3 of the other side of the foil 1, later on during fabrication to constitute the outside surface of the container body prior to sheathing, can be chosen in accordance with other requirements, such as wear resistance, suitability for printing, carrier materials, environmental influences, and so forth. Selective coating of both sides of the carrier foil 1 with different materials therefore provides optimum accommodation of the inside and outside surfaces of the container body to prevailing requirements.

Now it has been found that as the coating materials there are best suited the polyolefins. However, it is equally possible to also use without difficulty PVC, PVDC, and so forth. Inasmuch as the carrier foil 1 is embedded on all sides in heat-sealable plastic material a heat-sealing of the edges can be easily carried out.

In order to produce collapsible containers or tubes or similar tube-shaped container bodies, according to a further procedural step of the invention, the coated carrier foil 1 is now wound or rolled cylindrically or helically, as desired, in a well-known manner such as to form a tube 5, and specifically with the lateral edges 6 and 7 of the coated foil 1 which are subsequently to be bonded to one another disposed in overlapping fashion. In this connection, attention is invited to FIG. 3 showing the overlapping arrangement of the lateral edges 6,7. The longitudinal seam 8 which, depending on the technique of winding the carrier foil 1, in the first instance extends parallel to the tube axis, and in the second instance, extends helically, is then heat-sealed.

Winding of the carrier foil into a tube can be undertaken in one or in several layers. Moreover, the seam 8 can be made as a simple overlapping seam, or the overlapping portions can be folded or rolled one into the other prior to heat-sealing.

Now, after having formed the tube from the coated strip of web material, this tube will next be sheathed all around with a further coating 9 of plastic in order to cover the overlapping seam 8 of the tube 5, as best depicted in FIG. 3, and to thereby obtain a completely smooth outer surface of the tube and a uniform wall thickness. When the tube of coated carrier material is intended to serve the purpose of making collapsible tubes, the sheathing 9 will preferably be formed by an extrusion technique. At the same time with the actual sheathing operation or subsequent to the sheathing operation, a conventional tube head provided with a screw thread for the tube cap is added to the free end of the sheathed tube, preferably by injection molding or pressure molding techniques.

Before discussing the tube capping operation which constitutes part of the method aspects of this invention, attention is again directed to the sheathing operation which, according to the invention is carried out in such controlled fashion that the sheathed tube is prepared in a manner that the subsequent capping operation is rendered simpler and more reliable. It is important to the invention that the plastic material constituting the sheathing 9 be applied to the tube 5 in such a controlled way as regards the amount of material and its distribution along the outside surface of the tube, that the tube with the sheathing located thereon will possess an outside surface, the shape and dimension of which substantially corresponds to the internal receiving wall of the molding cavity of the molding equipment for heading the tube. It is important to successful heading of the tube, with a minimum of difficulty as to sealing of the molding equipment and specifically the molding cavity for the tube head, that the shape and dimension of the outside surface of the sheathed tube be closely accommodated to the internal receiving wall of the molding cavity. In this way, when the end of the thus-produced tube is inserted into the mold for capping it snugly rests by means of its outside surface against the inner wall of the mold cavity, thereby providing a good sealing fit. Due to the fact that the inside wall of the inserted end portion of tube when received in the mold cavity is exposed, and when moldable material is injected into the mold, such acts against such inside wall portion of the tube, generating radially applied or directed forces on the inside wall of the tube, and in turn, thereby urging the outside surface of the tube into even greater sealing engagement with the inside wall of the mold cavity. As a result of these measures, there is provided an extremely effective seal for the moldable plastic material used for heading the tube, by the coaction of the tube itself with the mold cavity walls. Consequently, it is not necessary to provide expensive and complicated sealing arrangements for the mold unit, simplifying fabrication of headed collapsible tubes, and reducing the number of rejects.

With the benefit of the foregoing general discussion, reference is now made to FIG. 4 diagrammatically illustrating molding equipment, specifically an injection mold 10 placed over the free end of a tube 5 formed in accordance with the method heretofore discussed, and by means of which mold 10 the heading or tube cap can be applied. Mold unit 10 can also be a pressure mold. The mold unit 10 is preferably formed of two parts 20 and 21 provided with the complementary cavities 11 possessing the desired shape or configuration of the tube head or cap to be formed. The tube 5 after the sheathing 9 has been applied, may be cut into finite sections if it is of such length that a number of tubes should be formed from the initially produced tube structure, and then each such tube section, again conveniently referred to merely as a tube 5 can be placed upon a conventional and therefore non-illustrated mandrel prior to insertion of one end 5a of such tube into the confines of the mold cavity 11. It will be recalled that a significant aspect of the invention as previously explained constituted the controlled application of the sheathing 9 to the tube structure such that the shape and dimension of the outside surface substantially corresponded to the shape and dimension of the internal receiving wall 22 of the mold cavity 11 of the mold unit 10. Hence, by virtue of these measures and owing to the fact that the sheathing of the tube 5 provides a completely smooth outer surface for the tube, there is obtained a precise and snug fit at location 12 between the mold 10 and the outer surface of the tube 5 itself. Consequently, there is effectively prevented leakage of the moldable material between the mold and the outer tube surface during the actual injection molding operation. In fact, it will be recognized by again referring to FIG. 4 that the inner mold portion or part 21 has a stepped region 23 which serves to expose the inside wall of the tube 5 at least at the end portion 5a thereof received within the mold cavity 11. Hence, the moldable plastic material which appears in the mold cavity 11 under increased pressure can flow into the interior of at least the end portion 5a of the tube 5 received in the mold unit 10, to thereby apply a radially directed or outwardly extending force against the inner wall of such end portion 5a of the tube 5. This outwardly directed or radial force tends to further urge the outside surface of the end portion 5a of the tube 5 into even greater contact with the internal receiving wall 22 of the mold cavity 11, thereby further promoting the aforementioned sealing action which is effectively provided by virtue of the invention.

Application of the sheathing 9 can be effected in one or several layers. Moreover, if it is desired, the sheathing can be heat-sealed to the laminated outer side of the coated carrier foil.

Not only does the sheathing provide the desirable sealing effect noted above, but additionally it serves as a carrier element for an imprint to be made on the outer surface of the tube, and since it covers the longitudinal seam, it ensures that the container may be properly printed completely about its circumference and that a smooth outer surface and uniform wall thickness is achieved for the reasons explained above.

A container construction produced according to the heretofore described method aspects of the invention not only is gastight and preferably impermeable to light in both directions, that is from the filled container contents towards the outside and from the outside towards the filled container contents, but additionally possesses an increased resistance against shrinking of the plastic material due to the improved physical properties of the carrier foil.

In order to obtain an increased safety of the container structure against contact of the container contents with the carrier foil and to prevent such contact in any event, even when, for instance, the plastic layer applied to the carrier foil is defective or, for instance, contains pores or openings, it can be desirable to provide the side of the foil facing the container contents with a barrier layer prior to the actual coating of the carrier foil as heretofore described with the plastic layer or layers. Hence, a barrier sheet of plastic, such as for instance polyester, polyamide, and so forth, can be bonded with the carrier foil 1 by means of composite plastic material applied by slot dies. The plastic coating layer 2 or 3 which is then intended to make actual contact with the container contents or filled-in substance is subsequently applied on top of the barrier layer in the heretofore described manner.

Now, for the purpose of achieving an increased adherence and bond of the outer plastic layer 3 with the carrier foil 1, especially if the carrier foil is formed of metal, for instance, it can be advantageous to first apply a composite sheet, for instance a paper sheet on the outside surface of the carrier foil prior to the application of the plastic coating layer. In order to bond such paper sheet with the carrier foil, a composite plastic material is applied to the carrier foil, again for instance by means of a slotted die or equivalent structure, and then the paper sheet is applied to the composite plastic. Thereafter, the paper foil is coated in the heretofore described manner with the plastic coating layer.

It is preferable if the carrier material is impervious to light. However, this carrier material could also be slightly transparent in order to provide a translucent container structure.

Furthermore, the carrier material may be chosen such that the finished container affords a flexible or rigid wall.

Hence, with the inventive technique of fabricating containers or tubes, it is possible to provide a flexible or rigid container body which, at the same time, is gas-tight and impervious to liquids as well as to light and also resistant to solvents.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. A method for the production of fluid-tight collapsible tubes provided with a tube heading, comprising the steps of coating an impervious, substantially strip-shaped carrier foil on at least one side with heat-sealable plastic, forming the coated carrier foil to the shape of the container body by overlapping these adjacent edges of the coated carrier foil, heat-sealing the adjacent overlapped edges of the coated carrier foil to form said body, and applying a plastic sheathing over the heat-sealed container body to cover the outside of the container body, controlling the application of the plastic sheathing to the container body such that the shape and dimension of the outside surface of the sheathed container body substantially corresponds to the shape and dimension of an inner wall of a mold cavity of a tube heading mold, then inserting at least an open end portion of the sheathed container body into the mold cavity of the tube heading mold, with at least the outside surface of the end portion of the sheathed container body received in the mold cavity snugly bearing in sealing contact against the inner wall of the mold cavity, and with the inner wall of at least the open end portion of the container body received in the mold being spaced from an inside wall of said mold cavity, introducing moldable plastic material into the mold cavity for forming the tube heading and into contact with the open end portion of the container body, applying substantially radially directed forces to the spaced inner wall of the container body to further urge the outside surface of said end portion of the container body against the inner wall of the mold cavity to thereby prevent escape of the moldable plastic material out of the mold cavity, and completing molding of the tube heading to the container body.

2. The method as defined in claim 1, including the step of extruding the plastic sheathing over the heat-sealed container body.

3. The method as defined in claim 1, including the step of fusing the sheathing together with the coated carrier foil.

4. The method as defined in claim 1, wherein application of the plastic sheathing to the container body is controlled such that the diameter of the outside surface of the sheathed container body is only slightly smaller than the diameter of the inner wall of the mold cavity receiving the end portion of the sheathed container body.

5. The method as defined in claim 1, including the step of coating the carrier film on both sides with a layer of plastic, the plastic layer on one side having properties differing from those of the plastic layer on the other side.

6. The method as defined in claim 1, wherein the step of forming the coated carrier foil to the shape of the container body comprises bending the coated carrier foil into a substantially cylindrical tube with the edges of the foil in overlapping relationship.

7. The method as defined in claim 1, wherein the step of forming the coated carrier foil to the shape of the container body comprises winding the coated carrier foil helically to form a tube with the helically extending edges of the foil disposed in overlapping relationship.

8. The method as defined in claim 1, wherein prior to coating of the carrier foil a barrier layer sheet is applied by means of a composite plastic material on to the side of the carrier foil intended to form the inner surface of the finished collapsible tube.

9. The method as defined in claim 1, including the step of using a metal foil as the carrier foil.

10. The method as defined in claim 1, including the step of using a paper foil as the carrier foil.

11. The method as defined in claim 1, wherein prior to coating of the carrier foil a paper sheet is applied by means of a composite plastic to the side of the carrier foil intended to form the outer side of the finished collapsible tube, in order to thereby improve the adherence of a subsequently applied plastic layer to the carrier foil.

12. The method as defined in claim 11, further including the step of applying the coating of plastic material to the carrier foil by means of a slot die.

13. The method as defined in claim 1, including the step of using a carrier foil material which is impervious to light.

14. The method as defined in claim 1, including the step of cutting the sheathed container body into finite sections, each of which is then introduced into the mold cavity for heading each such container body section.

* * * * *